UNITED STATES PATENT OFFICE.

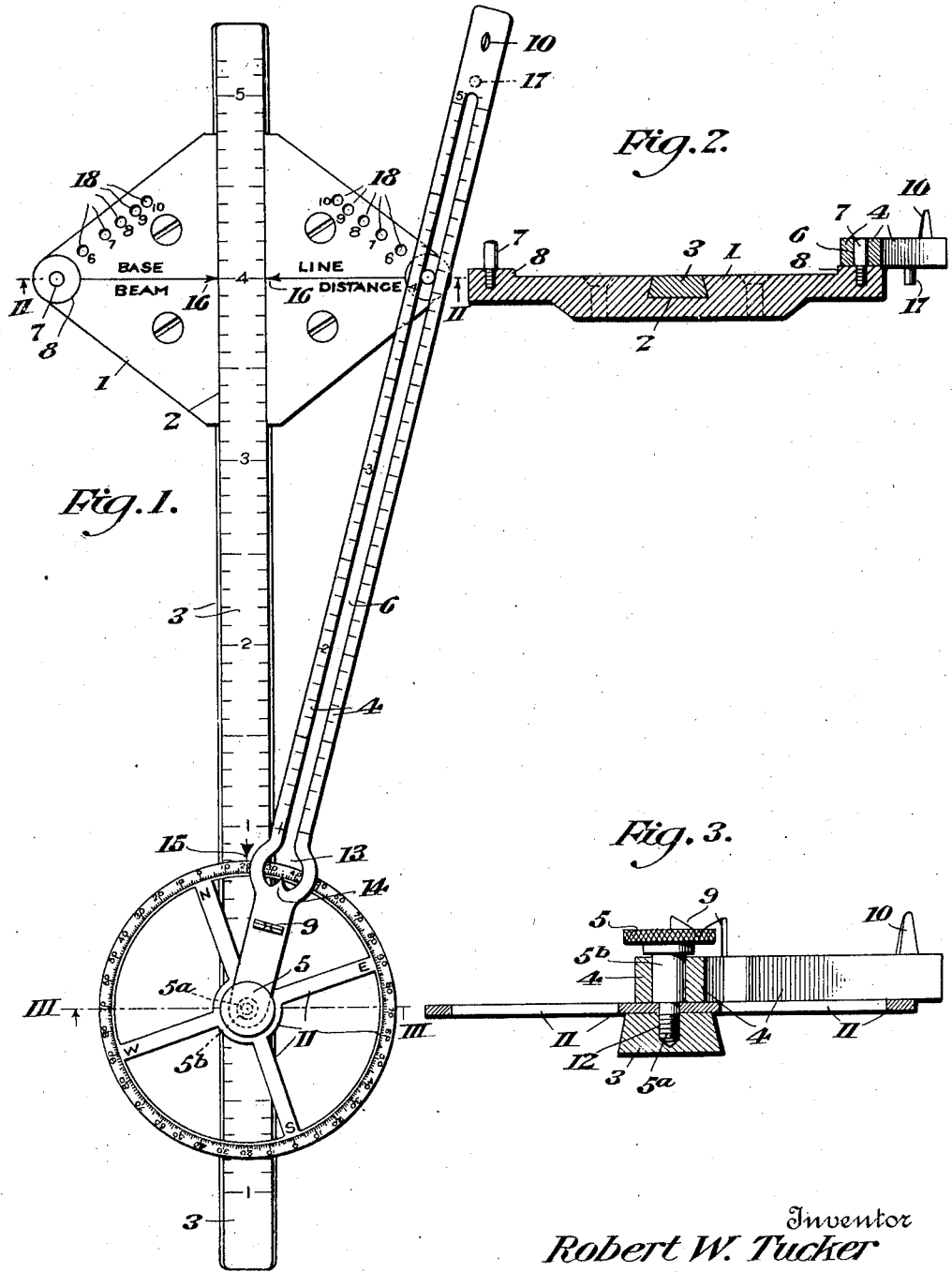

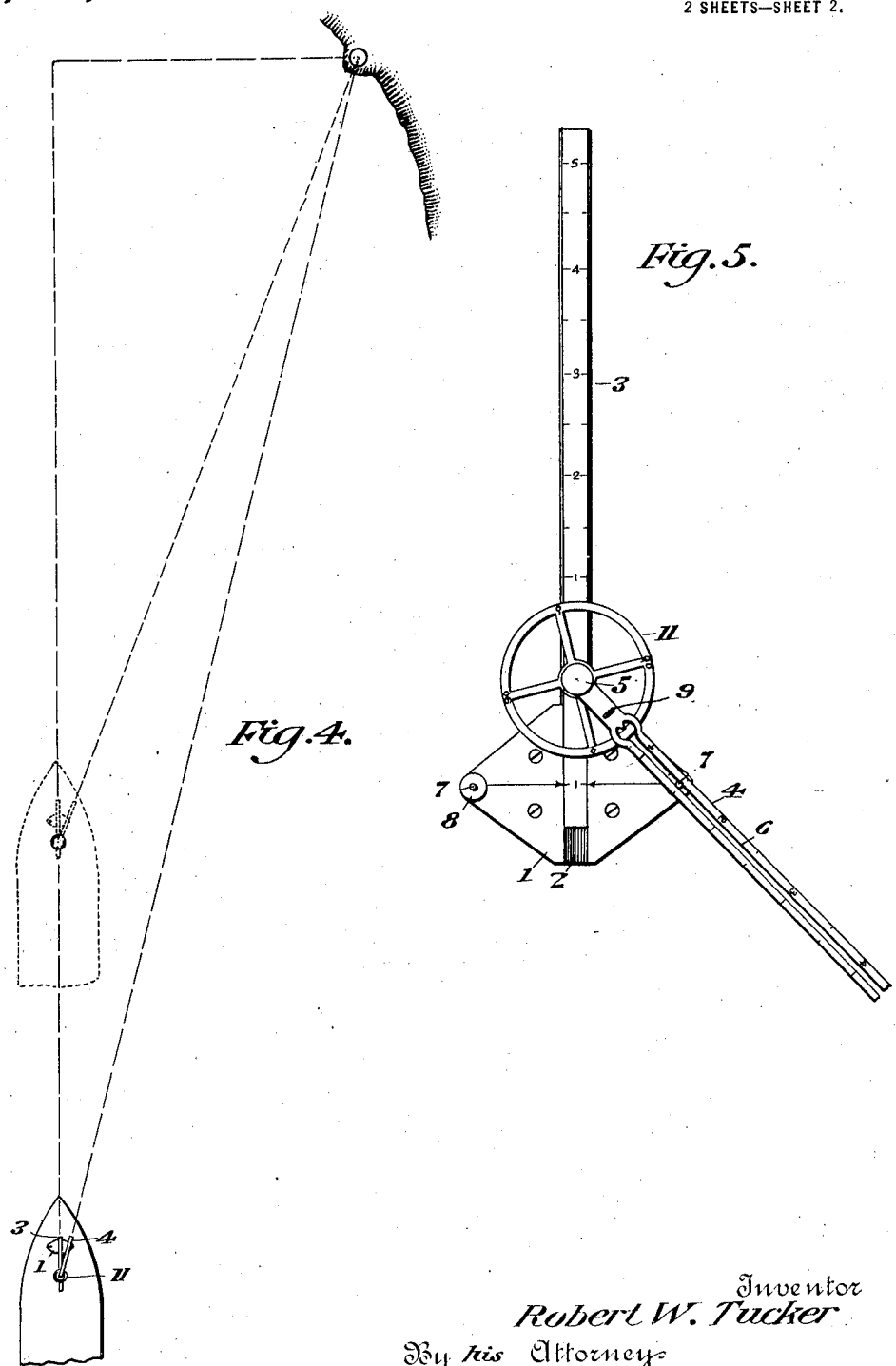

ROBERT W. TUCKER, OF WESTON, MASSACHUSETTS.

NAVIGATOR'S INSTRUMENT.

1,345,289.

Specification of Letters Patent. Patented June 29, 1920.

Application filed July 30, 1919. Serial No. 314,331.

*To all whom it may concern:*

Be it known that I, ROBERT W. TUCKER, a citizen of the United States, and resident of the city of Weston, county of Middlesex, and State of Massachusetts, have invented certain new and useful Improvements in Navigators' Instruments, of which the following is a specification.

This invention relates to improvements in navigators' instruments, and has for its general object the provision of a simple and inexpensive instrument by the aid of which a navigator may readily ascertain any one or more of a large variety of time, distance and course values.

Another important object of the invention is to provide a simple and inexpensive distance finding instrument so constructed that a navigator may ascertain without employing complicated tables and without elaborate mathematical calculations the direct distance between a ship and another object either when abeam or on any other bearing, the distance to be run to bring an object abeam or on any other bearing relatively to the course of the ship, the distance an object will be off the ship when abeam or when on any other bearing, or the distance an object is off the projected course of a ship.

A further important object of the invention is to provide simple means for readily determining in advance the time an object will be abeam or on any other bearing relatively to the ship's course, or the time that will be required to bring the object abeam of the ship or on any other bearing off the ship.

Another important object of the invention is to provide simple means for readily determining the course to be set to pass at any desired distance off an object.

Another object is to provide simple means whereby the position of a ship may be readily located upon a chart.

A further object of the invention is to provide a simple combined distance, position, course, and time finding instrument for navigators adapted for use on ships, airships, aeroplanes, sea-planes, or the like.

In the accompanying drawings.

Figure 1 is a plan view of one form of instrument illustrating the preferred embodiment of the invention;

Fig. 2 a transverse section on the line II—II of Fig. 1;

Fig. 3 a transverse section on the line III—III of Fig. 1, on an enlarged scale;

Fig. 4 a diagrammatic view illustrating the method of employing the device; and

Fig. 5 a plan view of illustrating the manner of employing the device in taking bearings of objects astern of a vessel.

Referring to the drawings by numerals, 1 designates the base of the instrument and 2 designates an undercut channel or guideway formed in the upper side of the base. The base 1 is adapted to be secured by suitable fastening means to any suitable support on a vessel, airship, aeroplane, or the like, preferably in a position giving a practically unobstructed view all around the horizon, with the channel 2 extending in an exact fore and aft direction or parallel with the longitudinal center line of the vessel. When used on board a ship, the base is preferably secured to a suitable support on the bridge adjacent the ship's compass. A course arm 3 having downwardly and outwardly flaring side edges is slidably held in the under-cut channel or guide-way 2 to move in a fore and aft direction parallel with the course of the vessel, aeroplane or the like. A bearing arm 4 is pivotally and detachably held to the course arm 3 by a shouldered pivot screw or post 5, preferably at a point intermediate the ends of the course arm as shown in the drawings.

The bearing arm 4 is provided with a vertical slot 6 which extends longitudinally of the arm substantially throughout the length of arm. The base 1 is provided with two oppositely disposed guide posts or studs 7 rigidly held to raised portions or bosses 8 on the base at points equal distances from the medial line of the channel 2 and on a line at right angles to the path of movement of the course arm. One of the posts 7 is adapted to engage in slot 6 in the bearing arm to form a sliding and pivotal connection between the bearing arm and the base when the instrument is employed in taking bearings to starboard of the ship's course and the other post is adapted to engage in slot 6 when the instrument is used in taking bearings to port of the ship's course. Suitable sights 9 and 10 are secured to the bearing arm 4 adjacent the opposite ends of the arm.

A suitable skeleton disk-like course protractor 11 is preferably adjustably held between the bearing arm and the course arm by the pivot screw 5, said protractor being graduated on its upper surface around its perimeter in degrees of a circle, either in the manner shown or in any other suitable or known manner. The lower end portion 5ª of the screw 5 is threaded and screws into a threaded socket 12 in the course arm. The protractor 11 is substantially equal in thickness to the height of the bosses 8 and is of slightly less diameter than the shortest distance between the bosses, and is formed with a central aperture through which the end portion 5ª of the screw 5 extends. Said protractor is rotatable about the screw and is adapted to be locked in its various rotatably adjusted positions by tightening the screw to clamp the protractor between the course arm and a shoulder formed by the lower end of an intermediate shank portion 5ᵇ of the screw. The shank portion 5ᵇ extends through an aperture in the bearing arm and is slightly greater in length than the vertical thickness of the bearing arm to permit free pivotal movement of said arm after the screw is tightened to clamp the protractor. All parts of the instrument, including the protractor 11, are preferably formed of nonmagnetic metal.

The slot 6 in the bearing arm is widened at its rear end to form an enlarged sight opening 13 through which the graduations on the course protractor 11 may be easily read, and a fixed pointer 14 is preferably provided on the bearing arm extending partly across the opening 13 in alinement with the longitudinal center of the bearing arm, and the center of screw 5 and sights 9 and 10. The course arm is stamped or otherwise provided with an indicator mark or fixed pointer 15 in alinement with the longitudinal center thereof, and the center of pivot screw 5 at a point adjacent the perimeter of the protractor 11. The course arm and bearing arm are provided with graduations, preferably stamped in the metallic arms, said graduations dividing each of the arms from a zero point coincident with the axis of screw 5 to a point adjacent the forward end thereof into units equal in length to the length of a line extending at right angles to the course arm, between the center of one of the posts 7 and the medial line of the course arm, which line constitutes the fixed side of a triangle the other two sides of which are formed by the course and bearing arms. The unit graduations on the arms are subdivided into fractions, preferably tenths, as shown, and the base 1 is stamped or otherwise provided with fixed indicating means such as indicating marks 16, preferably at both sides of channel 2, in alinement with the centers of the posts 7. The course arm is preferably provided with graduations along both edges of its upper side and the bearing arm is preferably provided with graduations along both edges of slot 6, as shown. That portion of the course arm which extends rearwardly of screw 5 is graduated in units and fractions thereof, similar to the graduations above described, from a point coincident with the center of the screw to a point adjacent the rear end of the course arm. This portion of the course arm serves as a handle for adjusting the instrument in taking bearings of objects forward of a point abeam of the ship and is also adapted to form one side of the instrumental triangle in taking bearings of objects at the rear of a point abeam of the ship, the course arm being shiftable to pass the protractor between the bosses 8 and thus swing the bearing arm until its free end is at the rear of the post 7. As it is rarely necessary to take bearings of objects at a considerable distance astern this rear portion of the course arm may be made relatively short, as shown, to make the instrument more compact. In the event that it is desired to take bearings of an object so far astern as not to be within the field of the instrument when employing the short rear section of the course arm in coöperation with the bearing arm, the instrument may be readily reversed by disconnecting the arms, withdrawing the course arm from the channel and re-inserting the same in the channel in the reverse direction, and again connecting the bearing arm with the course arm and the proper guide post 7. It will also be obvious that the entire instrument might be bodily reversed if desired, and for this purpose might be fixed on a rotatable support.

The bearing arm 4 is provided with a depending stud, projection or post 17, and may be disengaged from post 7 to engage stud 17 in either one of two series of sockets 18 formed in the base 1 at opposite sides of the course arm, the base 1 being stamped or otherwise provided with indicating numerals adjacent said sockets, indicating the proportional relation the distance between the medial line of the course arm and the center of the socket bears to the distance between the axis of screw 5 and the center of the stud 17. As shown, these sockets are numbered 6, 7, 8, 9 and 10 and the direct distances between the centers of the sockets and the medial line of the course arm are respectively 1/6, 1/7, 1/8, 1/9 and 1/10 of the distance between the axis of screw 5 and the center of stud 17. When the stud 17 is engaged in one of the sockets 18 the instrument forms a right angle triangle the base of which equals in length the fractional part of the hypotenuse indicated by the numeral adjacent the socket.

It will be observed that when the bearing arm 4 is pointing at a fixed object, with one of the posts 7 engaging in slot 6, the instrument forms a triangle that is similar to the great triangle formed by the position of the ship at the time of taking the bearing, the fixed object, and the point where the ship will be when the object is abeam. As the two last points remain the same in the great triangle so long as the ship holds the same course, they are also stationary in the instrumental triangle, the point where the center line of the course arm crosses a line at right angles thereto intersecting the guide post of the bearing arm corresponding to the point where ship will be when the object is abeam, the guide post of the bearing arm at the side of the base corresponds to the fixed object, and the axis of the pivotal connection of the two arms corresponds to the position of the ship.

As the ship moves ahead on her course she is shortening the distance to the point where she will have the object abeam, and the pivotal point of the two arms of the instrument must be moved ahead to keep the bearing arm pointing at the fixed object or to again bring the arm to bear on the object. In so doing the fore and aft side of the instrumental triangle is shortened in the same proportion as the ship's course line to a point where object will be abeam is shortened. So, if after taking one bearing, the ship runs a certain distance, and the pivotal point of the two arms is advanced to cause the bearing arm to again point at the object it will be obvious that by dividing the distance run between the taking of the two bearings by the difference between the readings of the course arm at the times of taking the two bearings the beam distance or length of the base line of the great triangle is obtained. As the two arms are graduated in units of the base line the lengths of the other two sides of the great triangle may be readily computed.

The principal uses and modes of operating the instrument are as follows, although other uses therefor will suggest themselves to navigators:

*Distance finding operations.*

1. To find the distance between a ship and an object coincident with the arrival of the ship at a point at which the object is abeam:

(a) Set the instrument so that the course arm reads 1.0 at the indicator mark 16 on the base and note when the object is in alinement with the sights on the bearing arm. The distance, as shown by the ship's patent log or otherwise computed, run by the ship from that time until the object is abeam equals the distance the ship is off the object when it arrives at a point at which the object is abeam.

(b) Adjust the course arm at any time until the object is seen through the sights on the bearing arm and note the reading of the course arm at indicator mark 16 on the base. Continue on course until object is abeam of the ship. The distance run by the ship between the taking of the bearing and the arrival of the ship at a point at which the object is abeam of the ship divided by the reading of the course arm at the time of taking the bearing equals the distance the object is off the ship when abeam.

2. To find in advance the distance a ship will pass off an object when the object is abeam of the ship:

(a) Take a bearing of the object through the sights on the bearing arm and note reading on course arm. Then set the course arm ahead a distance equal to one full unit on the scale and note when the object comes on the new bearing for which the bearing arm is thus set. The distance run between the taking of these two bearings equals the distance the ship will pass off the object when it arrives at a point at which the object is abeam thereof.

(b) Take bearing of object at any time and note reading on course arm; then run a convenient distance and take a second bearing and note reading on course arm. Divide the distance run between bearings by the difference between the two readings of course arm and the result equals the distance the object is off or abeam of the projected course of the ship.

3. To find the distance to run to bring an object abeam of the ship:

Ascertain the beam distance as in Example No. 2$^a$ or 2$^b$ and multiply the beam distance by the second reading of the course arm. The result equals the distance to be run from the time of taking the second bearing until the object is abeam.

4. To find the direct distance of an object from a ship:

Ascertain the beam distance as in Example No. 2$^a$ or 2$^b$ and multiply the beam distance by the reading of the bearing arm at the center of guide post 7 at the time of taking the second bearing. The result equals the direct distance between the ship and object at the time of taking the second bearing.

*Time finding operations.*

1. To find the length of time required to run a ship to bring an object abeam:

(a) Take bearing of the object at any time and note reading on course arm. Then set course arm ahead one full unit on the scale and note the length of time required to run the ship until the object comes on the second bearing. Multiply the period of time required by the run between bearings by the second reading of the course arm and the result equals the length of time necessary to run after the taking of the second bearing to bring the object abeam.

(b) Take bearing of object at any time, note reading of course arm and then run a convenient distance and take a second bearing and reading of the course arm. Divide the length of time between taking of the two bearings by the difference between the two readings of the course arm and multiply the result by the second reading of the course arm. The result equals the length of time necessary to run after the taking of second bearing to bring the object abeam of the ship.

To ascertain at what time an object will be abeam of the ship:

Proceed as in Example No. 1ª or 1ᵇ next above and add the result to the time the second bearing was taken.

*Course setting operations.*

1. To set a course to pass at a desired distance off an object the distance of which from the ship is known, divide the distance of the object from the ship by the distance it is desired to pass off the object and then shift the course arm until the graduation on the bearing arm corresponding with the dividend obtained registers with the center of the guide post 7. Then alter the course of the ship until the object is seen through the sights on the bearing arm and run the ship on the course indicated at this time by the course arm. In order to make the instrument compact the bearing arm is shown of such length that the highest graduation is "5". If, therefore, the dividend is greater than "5", disconnect the bearing arm from the post 7 and insert stud 17 in the socket 18 having a number corresponding with the dividend and alter course as above until arm 4 bears on the object and the course arm will then indicate the proper course.

2. To set a course to pass at a desired distance off an object the distance of which from the ship is not known, ascertain the direct distance to the object as in Example No. 4 under "Distance finding operations" and proceed as in Example No. 1 next above.

*Position locating operations.*

1. To locate on the usual chart the position of the ship with relation to an object shown on the chart, set the ship's course (either "true", magnetic, or compass) on the protractor at indicator mark 15 and clamp protractor in this position by tightening screw 5. Find direct distance to object as in Example No. 4 under "Distance finding operations" and note bearing of the object as shown on the protractor at indicator 14 on bearing arm at time of taking second bearing. Plot this distance and bearing from the location of the object on chart and the position of the ship will be located on the chart.

2. To locate the point on the chart at which the ship will have the object abeam, proceed as in the example next above and plot ship's course on chart from the position thus located to a point at which a line at a right angle to the course intersects the object.

What I claim is:

1. A device of the class set forth comprising a support, a pair of pivotally connected arms mounted on the support and bodily shiftable relatively thereto, said support being provided with means for guiding one of said arms to move endwise and means for guiding the other arm to move over a fixed point at one side of the path of movement of the endwisely movable arm.

2. A device of the class set forth comprising a shiftable course arm, a bearing arm pivotally connected with the course arm, and a support provided with means for causing the course arm to move endwise only and the bearing arm to move past a fixed point at one side of the course arm when the course arm is shifted, said course arm being graduated from a point coincident with the pivotal point of the arms in units equal in length to the base of a right angle triangle of which a line extending from the pivotal axis of the arms to the fixed point past which the bearing arm moves is the hypotenuse.

3. A device of the class set forth, comprising a shiftable course member, means for supporting the course member to move endwise, a bearing member pivotally held to the course member, means for guiding the bearing member past a fixed point at one side of the path of movement of the course member when the course member is shifted, said members being graduated progressively from their pivot point in units of the shortest distance between the path of the course member and the fixed point past which the bearing member moves and said supporting means for the course member being provided with means for indicating the point at which a straight line through said fixed point extending at right angles to the path of the course member intersects the course member.

4. A device of the class set forth, comprising a course member, means for slidably supporting the course member on a vessel or aircraft to move endwise in a fore and aft direction relatively thereto, a bearing member pivotally held to the course member, and stationary guiding means located at a point at one side of the path of movement of the course member having a sliding and pivotal connection with the bearing member, said course member being graduated progressively from the pivotal point of the members in units of the shortest distance between said stationary guiding means for the bearing member and the path of movement of the course member.

5. A device of the class set forth comprising means forming a proportional triangle having one side of fixed length, the means forming the remaining two sides being shiftable in unison to vary the length of both of said two sides and the angle of one of said sides relatively to the fixed side, said shiftable means being provided with graduations in units of the length of the fixed side of the triangle.

6. A device of the class set forth comprising means forming a right angle triangle having one side of fixed length, the means forming the remaining two sides being pivotally connected at the point of intersection thereof and being shiftable to vary the length of both of said two sides of the triangle, means for guiding one of said shiftable side-forming means to move past one end of the fixed side of the triangle in a path at a right angle thereto, means for guiding the other shiftable side-forming means past the other end of the fixed side of the triangle, and means for indicating the length of the sides of the triangle formed by said shiftable means in units of the fixed side of the triangle.

7. The combination with a vessel, airship, or the like, of a navigator's instrument comprising a base fixed to the vessel or airship to move therewith and having a guideway extending in a direction fore and aft of the vessel or airship, an arm slidable in said guide way, a second arm pivotally held to the other arm and provided with a longitudinally extending slot, and a guide post fixed on the base at one side of the guideway and engaging in said slot.

8. The combination with a vessel, airship, or the like, of a navigator's instrument comprising a base fixed to the vessel or airship to move therewith and having a guideway extending in a direction fore and aft of the vessel or airship, an arm slidable in said guide way, a second arm pivotally held to the other arm and provided with a longitudinally extending slot, and a guide post fixed on the base at one side of the guideway and engaging in said slot, both of said arms being graduated in units of the shortest distance between the path of movement of the pivotal point of the arms and the center of said guide post, said base being provided with fixed indicating means adjacent the guideway at a point on a line extending between the guideway and guide post at right angles to the guideway.

9. The combination with a vessel, airship, or the like, of a navigator's instrument comprising a base fixed to the vessel or airship to move therewith and having a guideway extending in a direction fore and aft of the vessel or airship, an arm slidable in said guide-way, a second arm pivotally held to the other arm and provided with a longitudinally extending slot, a guide post fixed on the base at one side of the guideway and engaging in said slot, and means for indicating the angular relation of the arms.

10. A navigator's instrument, comprising a base adapted to be mounted on a vessel or aircraft and having a guideway therein, a course bar slidably mounted on said guideway to move endwise, a bearing bar having a longitudinal slot therein, a disk-like course protractor graduated in degrees of a circle and having a central aperture, means pivotally connecting said bars extending through the aperture in said protractor, and a guide post on the base engaging in the slot in the bearing bar, said bars being graduated progressively from their pivotal point in units equal to the shortest distance between the guide post and the path of movement of the course bar.

11. A device of the class set forth comprising a course arm, a bearing arm, means for pivotally connecting the bearing arm adjacent one end with the course arm, means adapted to be secured to a vessel or the like for supporting the course arm to move endwise in a direction fore and aft of the vessel, and a stud on the bearing arm, said course arm supporting means being provided with a series of sockets located at one side of the path of movement of the pivotal axis of the course arm and bearing arm at different fractional parts of the distance between the pivotal axis of the arms and the center of said stud.

12. A device of the class set forth, comprising a course bar, a support provided with means for guiding said course bar to move endwise, a bearing bar operatively connected to be shifted by the course bar to vary the angular relation of the bars, means on said support connected with the bearing bar for guiding the same past a fixed point at one side of the path of movement of the course bar when the course bar is shifted, and means for indicating the angular relation of said bars in different adjusted positions thereof.

13. A distance, time, position and course finding instrument comprising a course arm, means for supporting said course arm on a vessel to move endwise fore and aft thereof, a bearing arm having a longitudinal slot, means pivotally and detachably connecting the bearing arm adjacent one end to the course arm, a course protractor rotatable about the pivotal axis of the arms and graduated in degrees of a circle, a pair of guide posts on the course-arm-supporting means at opposite sides of the path of movement of the pivotal axis of the arms and equal distances therefrom either of which is adapted to engage in the slot in the bearing arm, said arms being graduated in units of the shortest distance between the path of movement of the pivotal axis of the arms and the center of either post, fixed indicating means on the bearing arm adjacent the edge of the protractor, and fixed indicating means on the course arm adjacent the edge of the protractor.

14. A navigator's instrument comprising a support, a course bar mounted thereon to move endwise, a course protractor, a bearing bar, means for pivotally connecting said bars and protractor, and means on the support for guiding the bearing bar past a fixed point at one side of the path of movement of the course bar.

15. A navigator's instrument comprising two members forming two sides of a proportional right angle triangle, means coöperating with said members to form a third side of the triangle of fixed length, and connections between the means forming said third side of the triangle and said members whereby the same may be shifted relatively to each other to form right angle triangles of different area, said members being graduated in units of the length of the third side of the triangle formed by said means.

16. A navigator's instrument comprising a support adapted to be mounted on a vessel, airship or the like, and a pair of pivotally connected arms mounted on said support to move past two fixed points on the support and graduated in units of the distance between said fixed points, said support being provided with a guideway in which one of said arms is slidable endwise parallel with the course of the vessel, airship or the like.

17. A navigator's instrument comprising a support adapted to be mounted on a vessel, airship or the like, and a pair of pivotally connected arms mounted on said support to move past two fixed points on the support and graduated in units of the distance between said fixed points, said support being provided with a guideway in which one of said arms is slidable endwise parallel with the course of the vessel, airship or the like, a member rotatably adjustable about the pivotal point of the arms and graduated in degrees of a circle, and fixed indicating means on said arms coöperating with the graduations on the rotary member.

18. A navigator's instrument comprising a support adapted to be mounted on a vessel, airship or the like, and a pair of pivotally connected arms mounted on said support to move past two fixed points on the support and graduated in units of the distance between said fixed points, one of said arms being provided with a pair of sights at longitudinally spaced points thereon, and said support being provided with means for maintaining the other arm parallel with the course of the vessel or airship.

19. A navigator's instrument comprising a course arm, a bearing arm, means for pivotally connecting said arms, means for shiftably supporting the course arm on a vessel or the like to move parallel with the course thereof, and means operatively connected with the bearing arm to guide the same over a fixed point at one side of the path of movement of the course arm.

20. A navigator's instrument comprising a course arm, a bearing arm, means for pivotally connecting said arms, means for shiftably supporting the course arm on a vessel or the like to move parallel with the course thereof, means operatively connected with the bearing arm to guide the same over a fixed point at one side of the path of movement of the course arm, said arms being graduated in units of the shortest distance between the path of movement of the course arm and said fixed point, said bearing arm being provided with a projection, means whereby the bearing arm may be disconnected from its guiding means, and fixed indicating means located different fractional parts of the distance between the projection on the bearing arm and the pivotal point of the arm adapted to coöperate with said projection to position the bearing arm relatively to the course arm when the bearing arm is disconnected from its guiding means.

This specification signed this 28th day of July, A. D. 1919.

ROBERT W. TUCKER.